US012779486B2

(12) United States Patent
Poppe et al.

(10) Patent No.: US 12,779,486 B2
(45) Date of Patent: Nov. 3, 2026

(54) COATING DEVICE

(71) Applicant: Dürr Systems AG, Bietigheim-Bissingen (DE)

(72) Inventors: Siegfried Poppe, Unterriexingen (DE); Johannes Höchsmann, Asperg (DE); Martin Keilbach, Oberkessach (DE)

(*) Notice: Subject to any disclaimer, the term of this patent is extended or adjusted under 35 U.S.C. 154(b) by 433 days.

(21) Appl. No.: 18/261,495

(22) PCT Filed: Jan. 17, 2022

(86) PCT No.: PCT/EP2022/050835
§ 371 (c)(1),
(2) Date: Jul. 14, 2023

(87) PCT Pub. No.: WO2022/157095
PCT Pub. Date: Jul. 28, 2022

(65) Prior Publication Data
US 2024/0082866 A1 Mar. 14, 2024

(30) Foreign Application Priority Data
Jan. 19, 2021 (DE) ..................... 10 2021 101 027.6

(51) Int. Cl.
*B05B 13/04* (2006.01)
*B05B 5/16* (2006.01)
(Continued)

(52) U.S. Cl.
CPC ........ *B05B 13/0431* (2013.01); *B05B 5/1616* (2013.01); *B05B 12/006* (2013.01); *B25J 11/0075* (2013.01)

(58) Field of Classification Search
None
See application file for complete search history.

(56) References Cited

U.S. PATENT DOCUMENTS 3,933,285 A * 1/1976 Wiggins ................ B05B 5/1641 361/228
4,020,866 A * 5/1977 Wiggins .................. B05B 5/165 361/228
(Continued)

FOREIGN PATENT DOCUMENTS

CN 103717312 A 4/2014
CN 106311509 A 1/2017
(Continued)

OTHER PUBLICATIONS

International Search Report and Written Opinion for PCT/EP2022/050835 mailed Apr. 7, 2022 (13 pages; with English translation).
(Continued)

*Primary Examiner* — Jethro M. Pence
(74) *Attorney, Agent, or Firm* — Taft Stettinius & Hollister LLP; Thomas E. Bejin; John W. Carpenter

(57) ABSTRACT

The disclosure relates to a coating device for coating components with a coating agent (e.g. paint), having a protected area which is explosion-proof and/or is under high voltage during operation and an unprotected area in which no explosive atmosphere prevails during normal operation. A plurality of sensors that measure process variables of the coating device are included with the sensors being arranged in the protected area. A data interface for external data communication, the data interface being arranged in the unprotected area is also included. A transmission system transmits data between the sensors in the protected area on the one hand and the data interface in the unprotected area. The disclosure additionally provides a collecting device in the protected area, the collecting device on the one hand being connected to the sensors and receiving measured values of the process variables from the sensors, and on the other hand being connected to the transmission system in
(Continued)

order to transmit the measured values of the sensors to the data interface.

17 Claims, 4 Drawing Sheets

(51) Int. Cl.
*B05B 12/00* (2018.01)
*B25J 11/00* (2006.01)

(56) References Cited

U.S. PATENT DOCUMENTS 4,085,892 A * 4/1978 Dalton .................... C23D 5/02 239/707
4,650,003 A * 3/1987 Euson ................ B05B 13/0431 250/227.14
5,218,305 A * 6/1993 Lunzer ................. B05B 5/0532 239/690
5,351,903 A * 10/1994 Mazakas .............. B05B 7/1472 239/707
5,660,334 A * 8/1997 Trusty .................... B05B 12/00 239/708
6,056,215 A * 5/2000 Hansinger ................ B05B 5/10 239/704
6,484,121 B1 * 11/2002 Filev .................... B05B 12/084 73/598
6,528,109 B1 * 3/2003 Filev ...................... B05B 12/12 118/712
6,936,106 B2 * 8/2005 Filev ...................... B05B 12/12 118/712
7,056,387 B2 * 6/2006 van der Steur ......... B05B 15/55 239/691
8,020,784 B2 * 9/2011 Baumann ............... B05B 12/14 239/3
8,329,259 B2 * 12/2012 Tani ....................... B05B 12/08 118/679
8,485,125 B2 * 7/2013 Baumann ................. B05B 5/10 118/712
8,627,780 B2 * 1/2014 Herre ..................... B05B 16/40 118/698
9,016,596 B2 * 4/2015 Baumann ............. B05B 5/0422 239/700
9,024,641 B2 * 5/2015 Yamasaki ................ B05B 5/10 324/543
9,043,169 B2 * 5/2015 Geiger ................... B05B 5/053 702/65
9,138,759 B2 * 9/2015 Pravert ..................... B05B 5/04
9,415,407 B2 * 8/2016 Umeki .................. G01R 31/52
9,630,199 B2 * 4/2017 Herre .................. B25J 19/0029
10,137,463 B2 * 11/2018 Collmer .................... B05B 5/10
10,919,160 B2 2/2021 Sakata et al.
11,135,605 B2 * 10/2021 Iwase ................... B05B 5/0255
11,154,892 B2 * 10/2021 Fritz ...................... B05B 15/58
11,198,145 B2 * 12/2021 Fritz ................... C08G 18/282
11,203,030 B2 * 12/2021 Fritz ...................... B05B 12/04
11,548,164 B2 * 1/2023 Collmer .............. B25J 19/0075
11,679,395 B2 6/2023 Nguyen et al.
11,813,630 B2 * 11/2023 Fritz .................. B05B 13/0452
11,878,317 B2 * 1/2024 Fritz ................... B25J 11/0075
11,944,990 B2 * 4/2024 Fritz .................. B05B 13/0452
12,226,797 B2 * 2/2025 Yoshida ............... B05B 12/006
12,325,036 B2 * 6/2025 Holtmann .............. B05B 15/18
12,390,824 B2 * 8/2025 Winter .................... B05B 15/00
12,465,936 B2 * 11/2025 Patel ........................ A23B 7/16
2002/0157605 A1 * 10/2002 Allen ..................... B05B 12/00 118/506
2004/0226391 A1 11/2004 Ucan
2005/0129872 A1 6/2005 van der Steur
2006/0175439 A1 * 8/2006 Steur ...................... B05B 12/08 239/690
2007/0057082 A1 3/2007 Mc Gloughlin et al.
2010/0145516 A1 * 6/2010 Cedoz .................... B05B 5/025 239/690
2010/0147215 A1 6/2010 Baumann et al.
2012/0244290 A1 * 9/2012 Mullin .................. G01K 1/026 118/712
2014/0199490 A1 * 7/2014 Mullin .................. G01K 1/026 118/712
2015/0239006 A1 * 8/2015 Yamasaki ............ B05B 5/0533 427/483
2017/0239822 A1 * 8/2017 Sakata .................... H02J 50/10
2017/0266808 A1 * 9/2017 Alonso ................. B25J 9/1612
2019/0022683 A1 1/2019 Donaldson
2019/0193421 A1 * 6/2019 Herre ................. B05C 11/1018
2024/0017281 A1 * 1/2024 Seiz ....................... B25J 13/088
2025/0196182 A1 * 6/2025 Yoshida ............. B05B 13/0431

FOREIGN PATENT DOCUMENTS

| | | | |
|---|---|---|---|
| DE | 10309143 | A1 | 9/2004 |
| DE | 102005042336 | A1 | 3/2007 |
| DE | 10 2007 004 819 | A1 | 8/2008 |
| EP | 1232799 | A2 | 8/2002 |
| EP | 3208051 | A2 | 8/2017 |
| EP | 3812849 | A1 | 4/2021 |
| JP | 2007513793 | A | 5/2007 |
| JP | 2010504850 | A | 2/2010 |
| JP | 2017144530 | A | 8/2017 |
| JP | 2019511377 | A | 4/2019 |
| WO | 2008037456 | A1 | 4/2008 |

OTHER PUBLICATIONS

Office Action from German Patent Office for related application No. DE 10 2021 101 027.6 mailed Aug. 24, 2021 (12 pages; with English machine translation).
Chinese Patent Office Search Report for related application No. 202280016391.9 dated Dec. 27, 2025 (2 pages; English translation).
Chinese Patent Office—Office Action and Search Report for related application No. 202280016391.9 dated Mar. 1, 2026 (10 pages; with English machine translation of Search Report).
Japanese Patent Office—Decision to Grant Patent for related application No. JP2023543173 dated May 7, 2026 (5 pages; with English translation).
German Patent Office—Official Communication on Examination dated Jun. 9, 2026 for related application No. DE 10 2021 101 027.6 (10 pages; with English machine translation).

* cited by examiner

COATING DEVICE

CROSS-REFERENCE TO RELATED APPLICATIONS

This application is a national stage of, and claims priority to, Patent Cooperation Treaty Application No. PCT/EP2022/050835, filed on Jan. 17, 2022, which application claims priority to German Application No. 10 2021 101 027.6, filed on Jan. 19, 2021, which applications are hereby incorporated herein by reference in their entireties.

FIELD

The disclosure relates to a coating device (e.g. painting robot) for coating components (e.g. motor vehicle body components) with a coating agent (e.g. paint).

BACKGROUND

In modern painting systems for painting motor vehicle body components, multi-axis painting robots are normally used which guide a rotary atomizer as an application device. To achieve a high degree of application efficiency and minimize overspray, electrostatic coating agent charging is generally used. This means that the applied paint is electrostatically charged to high-voltage potential while the vehicle body to be painted is electrically grounded. The applied spray of paint is therefore electrostatically attracted to the electrically grounded vehicle bodies, which increases the application efficiency and reduces overspray accordingly. However, the electrical potential separation between the electrically grounded part of the painting robot on the one hand and the high-voltage part of the painting robot on the other hand is problematic. For example, this potential separation can take place in one of the robot arms of the painting robot.

Such painting robots or the rotary atomizers guided by the painting robot usually have several sensors, such as pressure sensors or rotational speed sensors. These sensors are sometimes also arranged in the part of the painting robot that is at high-voltage potential. The data transmission of the measured values from the sensors in the part of the painting robot that is at high voltage to the electrically grounded part of the painting robot must therefore include potential separation. Optical waveguides are therefore used for this purpose in the state of the art.

One problem with such painting robots with an electrostatic coating agent charging and several sensors is the power supply for the electrically operated sensors in the high-voltage part of the painting robot. In the state of the art, batteries are provided for the individual sensors, but this is associated with various disadvantages. For example, the batteries have to be replaced relatively frequently, which involves costs for battery replacement and also consumes resources.

Another problem is that the individual sensors each require an opto-electronic transducer for data transmission via the optical waveguide, which is relatively costly because a correspondingly large number of opto-electronic transducers are required.

In addition, the individual sensors usually require one optical waveguide each, which is also costly.

DETAILED DESCRIPTION

Figure 1:
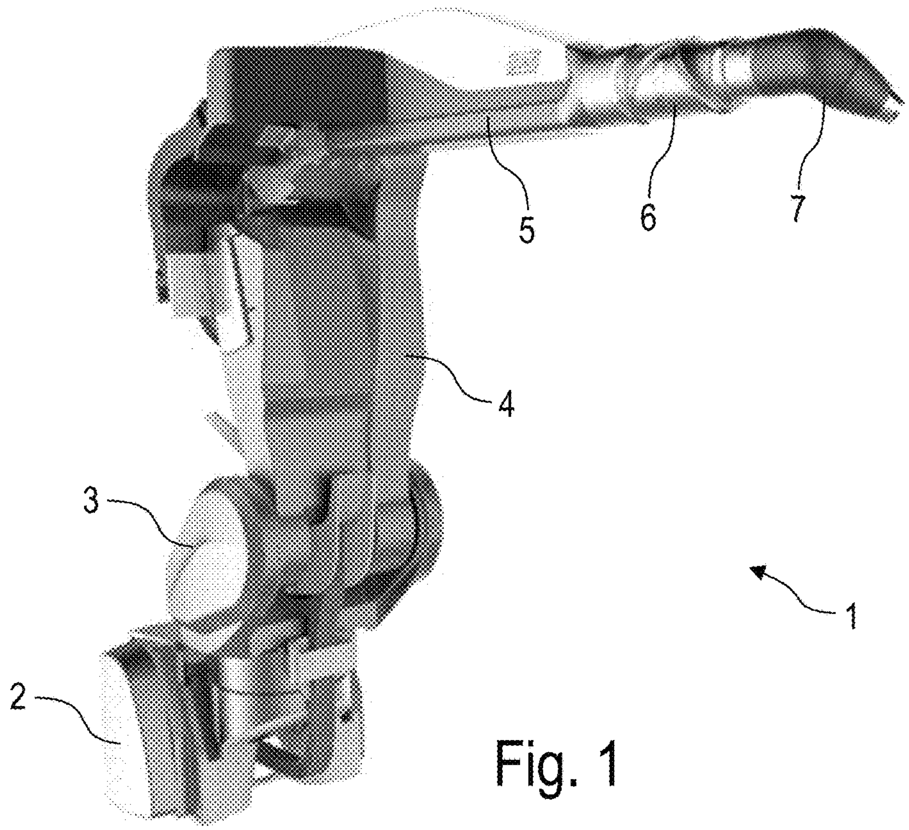
FIG. 1 shows a perspective view of a painting robot according to the disclosure.

The disclosure comprises the general technical teaching of arranging a collecting device in the high-voltage area of the coating device, which is connected to the individual sensors and collects and transmits the measured values of the sensors. This advantageously allows a central power supply of the sensors by the collecting device and also a bundled data transmission of the measured values of the sensors by the collecting device.

First of all, in accordance with the prior art described at the beginning, the coating device according to the disclosure comprises a protected area which is under high voltage during operation, as is the case, for example, with an electrostatic coating agent charging. For example, the protected area may be at a potential greater than 1 kV, 5 kV, 10 kV, 20 kV or greater than 50 kV.

However, the concept of a protected area used in the context of the disclosure does not necessarily require that the protected area is under high voltage during operation. Alternatively, it is also possible that the protected area is an explosion-protected area. Explosion protection for machine parts or areas of machines is known from the prior art and is standardized, for example, in the technical standards IEC/EN 60079-11-Part 11, IEC/EN 60079-25-Part 25 and IEC/EN 60079-14-Part 14.

However, the term of a protected area used in the context of the disclosure can also refer to those areas of the coating device which are under high voltage during operation and which are additionally also explosion-proof.

Furthermore, in accordance with the prior art described at the beginning, the coating device according to the disclosure comprises an unprotected area which is not explosion-protected or which is at ground potential during operation. Thus, also the term of an unprotected area may have different meanings in the context of the disclosure. For example, the unprotected area may be such an area of the coating device that is at ground potential during operation, in which case explosion protection is irrelevant. However, it is also possible that the term unprotected area, as used in the context of the disclosure, defines such a area of the coating device that is not explosion protected in operation, in which case the electrical potential of the unprotected area does not play a role. Furthermore, in the context of the disclosure, there is also the possibility that the term of an unprotected area defines such areas of the coating device which are at ground potential during operation and are not explosion-protected.

Furthermore, in accordance with the prior art described at the outset, the coating device according to the disclosure comprises a plurality of sensors for measuring process variables of the coating device, wherein the sensors are arranged in the protected area. For example, the sensors may be pressure sensors or speed sensors, as will be described in detail.

Furthermore, the coating device according to the disclosure comprises a data interface (I/O converter) to enable external data communication of the coating device, for example with a robot controller. The data interface is arranged in the unprotected area.

Furthermore, in accordance with the prior art described above, the coating device according to the disclosure also comprises a transmission system for transmitting data between the sensors in the protected area on the one hand and the data interface in the unprotected area on the other hand. For example, this transmission system can use optical waveguides, as already explained at the beginning of the prior art. Such optical waveguides advantageously enable electrical potential separation between the protected area on the one hand and the unprotected area on the other.

The coating device according to the disclosure is characterized—as already briefly mentioned above—by a central collecting device, which is arranged in the protected area. On the one hand, this collecting device is connected to the sensors and receives measured values of the process variables from the sensors. On the other hand, the collecting device is connected to the transmission system to transmit the measured values of the sensors to the data interface. Thus, the collecting device collects the measured values from the sensors and transmits them to the data interface in the unprotected area.

On the one hand, this central collecting device is advantageous because it means that the individual sensors do not require their own I/O interface (e.g. opto-electronic transducer). Rather, it is sufficient if the central collecting device comprises an I/O interface that contains, for example, an opto-electronic transducer and is connected to an optical waveguide.

On the other hand, the central collecting device is also advantageous because it can simplify the power supply to the sensors by supplying the individual sensors with the electrical energy required for operation from the central collecting device. Unlike the prior art described at the beginning, the individual sensors then no longer have to contain batteries, which have to be replaced frequently.

It has already been briefly mentioned above that the individual sensors in the protected area are preferably operated with electrical energy, whereby the electrical energy required for operation can be provided by the collecting device. The collecting device can in turn obtain the electrical energy required for operation from the transmission system, which thus has two functions. On the one hand, the transmission system serves to transmit data between the data interface in the unprotected area on the one hand and the collecting device in the protected area on the other. On the other hand, the transmission system also serves to transmit power from the unprotected area to the collecting device in the protected area, so that the collecting device can then supply the individual sensors with the electrical power required for operation.

In contrast, in another embodiment of the disclosure, the electrical energy required to operate the sensors is not transmitted from the transmission system to the collecting device. Instead, a power supply (e.g. battery) can be arranged in the protected area, which supplies the collecting device with the electrical energy required to operate the sensors, whereby the collecting device then transmits the energy to the individual sensors. This power supply in the protected area is preferably intrinsically safe to ensure explosion protection, as standardized in particular in the technical standards IEC/EN 60079-11-Part eleven, IEC/EN 60079-25-Part 25 and IEC/EN 60079-14-Part 14.

It has already been briefly mentioned above that the transmission system for data transmission between the collecting device in the protected area on the one hand and the data interface in the unprotected area on the other hand can have optical waveguides. The use of optical waveguides also enables electrical potential separation.

Alternatively, however, it is also possible for the transmission system to operate completely wirelessly in order to provide the necessary electrical potential separation between the protected area, which is at high voltage, on the one hand, and the unprotected area, which is at ground potential, on the other. For example, the transmission system can use inductive coupling, resonant-inductive coupling or capacitive coupling, to name just a few examples.

The transmission system can then have the following components:

- A transmitting coil for inductive coupling,
- an oscillator for driving the transmitting coil with an AC voltage signal,
- a resonant circuit on the transmitter side, which is coupled to the transmitting coil
- a receiver coil for inductive coupling with the transmitter coil,
- a receiver-side resonant circuit coupled to the receiving coil, and/or
- a rectifier for rectifying the signal coupled into the receive coil.

Thus, the transmission system can provide both wireless power transmission and wireless information transmission. However, it is alternatively also possible for the transmission system to serve only for wireless power transmission, while the measurement data of the sensors is transmitted by wire. Furthermore, it is alternatively also possible that the transmission system only transmits the sensor data wirelessly, while the energy required to operate the sensors is transmitted by wire.

In the preferred embodiment of the disclosure, the coating device comprises a coating robot (e.g. painting robot), which usually comprises a serial robot kinematics with a proximal robot arm ("Arm 1") and a distal robot arm ("Arm 2").

It should be mentioned here that the disclosure is not limited to paints with respect to the coating agent to be applied, but also encompasses other types of coating agents, such as adhesives, insulants, sealants, etc.

Furthermore, it should be mentioned that the disclosure is not limited to automotive body components with respect to the components to be coated. Rather, the disclosure also enables the coating of other types of components.

In the aforementioned coating robot, an insulating section 30 may be located in the distal robot arm between the protected area on the one hand and the unprotected area on the other hand. For example, such an insulating section can be formed as a partition wall made of plastic.

Furthermore, it should be mentioned that the transmission system can be arranged entirely or partially in the distal robot arm. For example, the above-mentioned components (transmitter coil, oscillator, transmitter-side resonant circuit, receiver-side resonant circuit, receiver coil, rectifier) can be arranged entirely or partially in the distal robot arm.

Furthermore, it should be mentioned that the coating device for electrostatic coating agent charging may comprise a high-voltage cascade, which is preferably arranged in the proximal robot arm of the coating robot.

Furthermore, within the scope of the disclosure, there is the possibility that at least one sensor is also arranged in the unprotected area of the coating device, such as a vibration sensor.

With regard to the sensors, various possibilities exist within the scope of the disclosure. It has already been briefly mentioned above that the sensors may be a pressure sensor or a speed sensor. However, there is also the possibility that the sensors may be flow sensors, force sensors, acceleration sensors, vibration sensors, temperature sensors, to name just a few examples.

Furthermore, it has already been mentioned above that the coating device comprises a data interface in the unprotected area to enable an external data connection. For example, this data interface may provide at least one of the following interface types:

Internet interface,

Bluetooth interface,

USB interface,

IO-Link,

Optical waveguide interface,

Analog interface, especially for the transmission of measured temperature values, Digital interface, Ethernet-based fieldbus systems, e.g. EtherCAT, Sercos III, Profinet.

Furthermore, it is to be mentioned that the collecting device can communicate digitally with the individual sensors.

Furthermore, within the scope of the disclosure, it is also possible that a power supply for the data interface is arranged in the unprotected area of the coating device, whereby this power supply can be designed more specifically to ensure explosion protection, as has already been explained above with reference to various technical standards on explosion protection.

In addition, it should be noted that the coating device can have a metering pump which meters the coating agent and has a specific inlet pressure and a specific outlet pressure during operation. In this case, the metering pump can be arranged in the protected area, with sensors measuring the inlet pressure and/or the outlet pressure of the metering pump. In addition, a temperature sensor can also be provided which measures a coating agent temperature, preferably on or in the metering pump.

Figure 2:
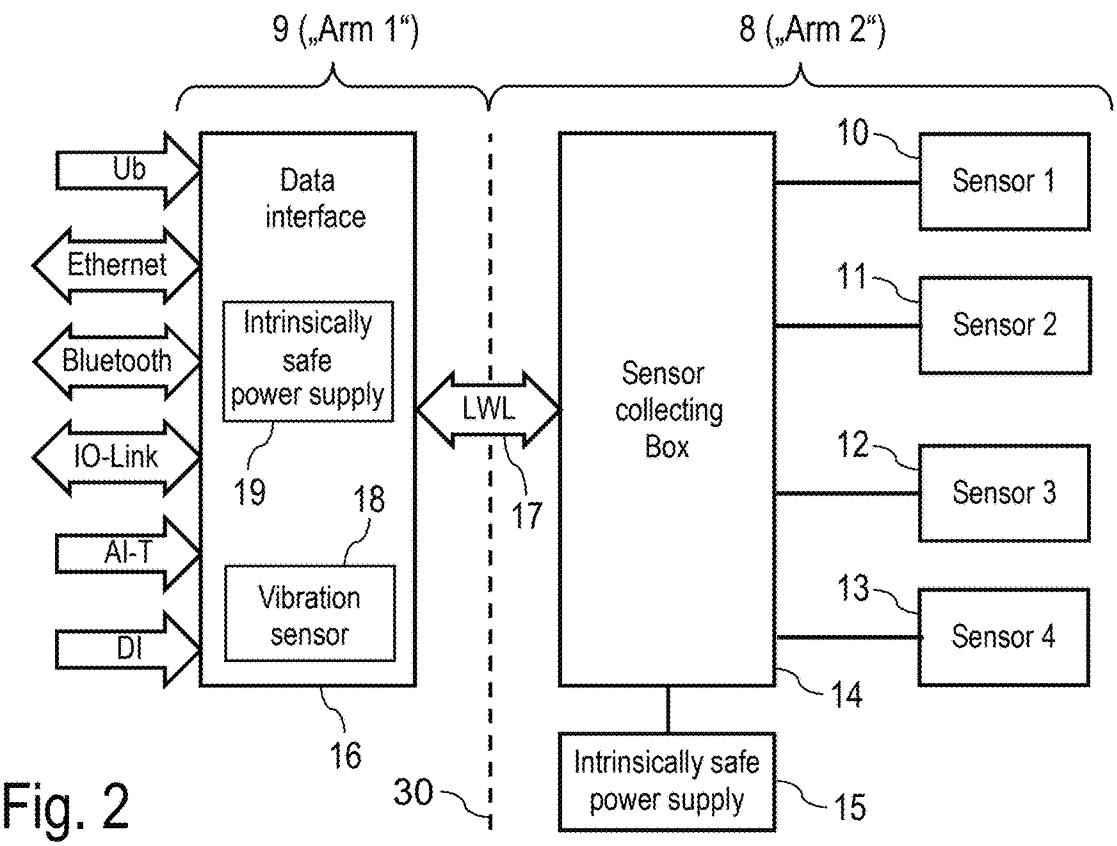
FIG. 2 shows a schematic representation of the painting robot of FIG. 1 with the various components in the robot arms.

The embodiment of a painting robot 1 according to the disclosure is described first, as it is shown in FIGS. 1 and 2.

The painting robot 1 has a largely conventional structure and includes serial robot kinematics with a robot base 2, a pivotable robot member 3, a proximal robot arm 4 ("arm 1"), a distal robot arm 5 ("arm 2") and a multi-axis robot hand axis 6, wherein a rotary atomizer 7 with an electrostatic coating agent charging is mounted on the robot hand axis 6.

Due to the electrostatic coating agent charging, an area of the painting robot 1 is at high-voltage potential during operation. FIG. 2 shows such a protected area 8, which is at high-voltage potential during operation and extends essentially over the distal robot arm 5, the robot hand axis 6 and the rotary atomizer 7.

In addition, the painting robot 1 has an area that is at electrical ground potential also during operation and is therefore not charged. FIG. 2 shows such an unprotected area 9, which is at ground potential and essentially comprises the proximal robot arm 4, the pivotable robot member 3 and the robot base 2.

In the protected area 8 there are a plurality of sensors 10, 11, 12, 13, which may be, for example, rotational speed sensors, pressure sensors, flow sensors or temperature sensors, to name but a few examples. It should be mentioned here that the sensors 10-13 are electrically operated and receive the electrical energy required for operation from a central collecting device 14, which is arranged in the protected area 8.

Furthermore, an intrinsically safe power supply 15, which may for example comprise an electric battery, is located in the protected area 8. The intrinsically safe power supply 15 supplies power to the central collecting device 14, which in turn supplies the sensors 10-13 with the electrical power required for operation. This is advantageous because the individual sensors 10-13 then do not require their own power supply in the form of a battery, which must be replaced frequently.

In the unprotected area 9 of the painting robot 1, there is a data interface 16 (I/O converter) which is connected to the collecting device 14 via an optical waveguide 17. The collecting device 14 and the data interface 16 thus each contain an opto-electronic transducer to enable data transmission via the optical waveguide 17.

In operation, the collecting device 14 collects sensor data from the sensors 10-13 and transmits it centrally to the data interface 16 via the optical waveguide 17.

The data interface 16 enables external data connection via the interface types shown, such as analog and/or digital interfaces (e.g., Ethernet bus, Bluetooth, IO-Link, analog interface AI-T, AI, AI/AO, digital interface DI) for transmitting temperature data.

Furthermore, the interface 16 may include a vibration sensor 18 and an intrinsically safe power supply 19.

Figure 3:
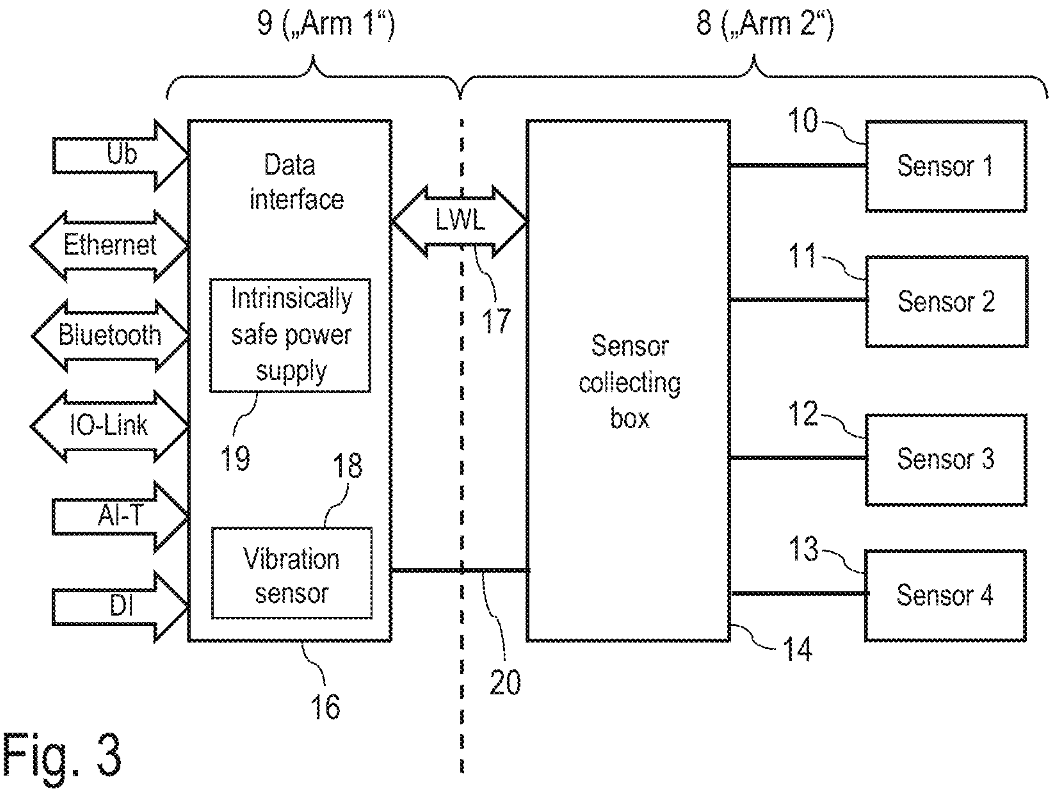
FIG. 3 shows a modification of FIG. 2.

FIG. 3 shows a modification of the embodiment according to FIG. 2, so that in order to avoid repetition, reference is made to the above description, whereby the same reference signs are used for corresponding details.

A special feature of this embodiment is that the intrinsically safe power supply 15 shown in FIG. 2 is missing in the protected area 8. Instead, the intrinsically safe power supply 19 in the unprotected area 9 is connected to the collecting device 14 via a power line 20. The collecting device 14 thus receives the electrical energy required to operate the sensors 10-13 from the intrinsically safe power supply 19 via the power line 20.

Figure 4:
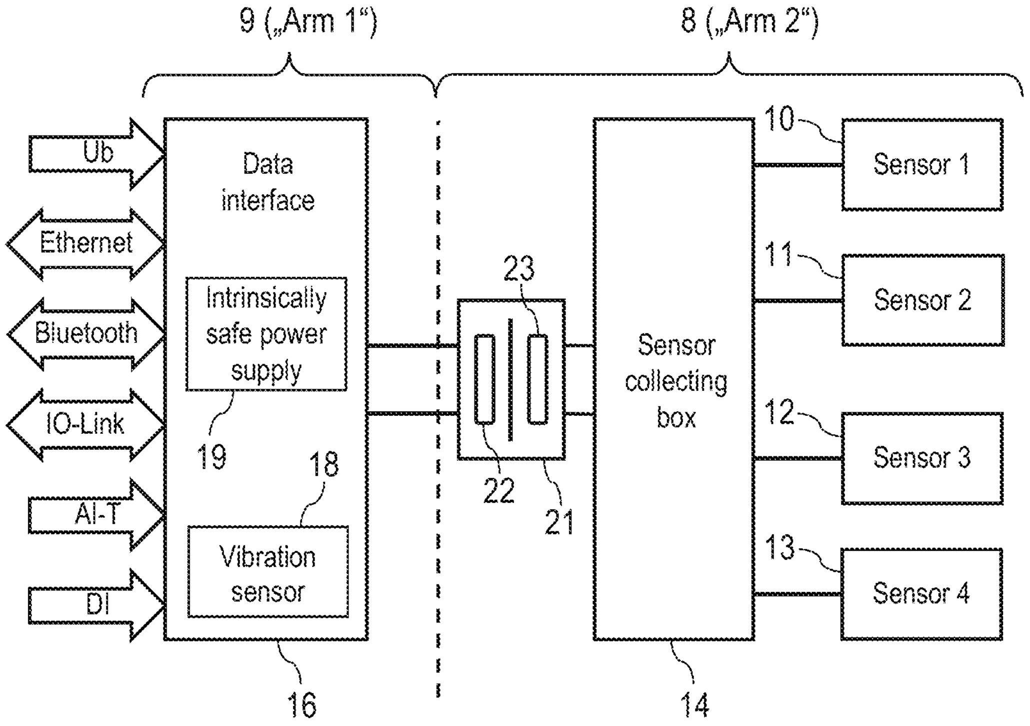
FIG. 4 shows a further variation of FIG. 2 with a wireless transmission system.

FIG. 4 shows a further variation of the embodiments according to FIGS. 2 and 3, so that in order to avoid repetition reference is again made to the above description, the same reference signs being used for corresponding details.

A particular feature of this embodiment is that the data interface 16 is connected to the collecting device 14 by a transmission system 21 having an inductive coupling. The transmission system 21 comprises a transmitting coil 22 and a receiving coil 23 which are inductively coupled.

In one aspect, the transmission system 21 enables power to be transmitted from the data interface 16 to the collecting device 14 so that the collecting device 14 can supply the sensors 10-13 with the electrical power required for operation.

On the other hand, the transmission system 21 also enables bidirectional data transmission between the data interface 16 and the collecting device 14 by modulating data signals onto the high-frequency signals. In this way, the collecting device 14 can transmit the sensor data to the data interface 16.

With regard to FIGS. 1-4, it should be mentioned that a modification without an electrostatic coating charging is also possible. In this case, the protected area 8 is an explosion-proof area, while the unprotected area 9 is not explosion-proof.

In addition, it is also possible for the protected area 8 to be under high voltage and explosion-proof, while the unprotected area 9 is at ground potential and has no explosion protection.

Figure 5:
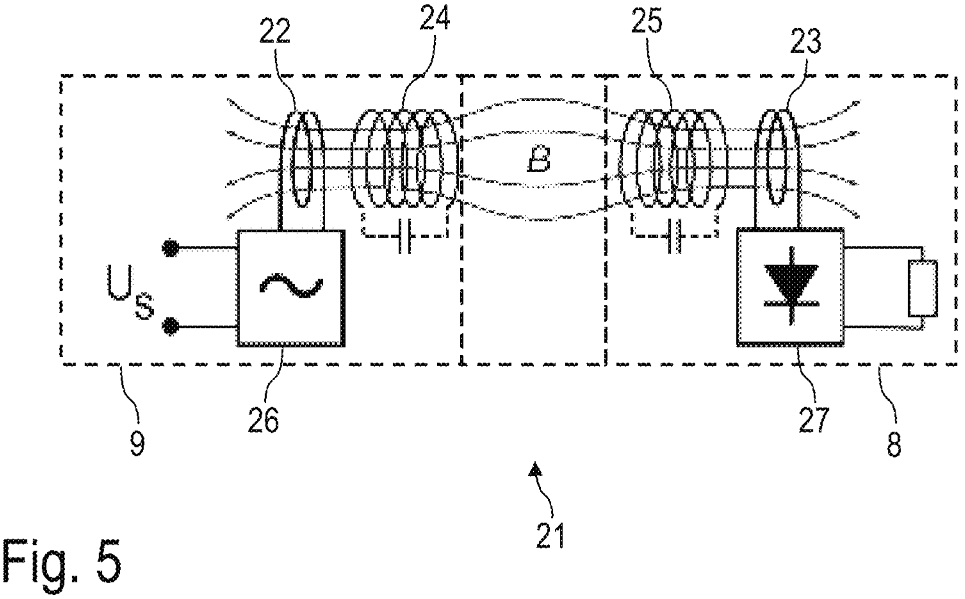
FIG. 5 shows a schematic representation of a variation of the wireless transmission system of FIG. 4.

FIG. 5 shows a modification of the transmission system 21 from FIG. 4, so that to avoid repetition reference is made to the above description, with the same reference signs being used for corresponding details.

A special feature here is that the transmitting coil 22 is inductively coupled to a transmitter-side resonant circuit 24, while the receiving coil 23 is inductively coupled to a receiver-side resonant circuit 25.

Furthermore, it is shown in the drawing that the transmitting coil 22 is driven by an oscillator 26, while the receiving coil 23 is connected to a rectifier 27.

Thus, in this embodiment, the transmission system 21 operates with resonant-inductive coupling.

Figure 6A:
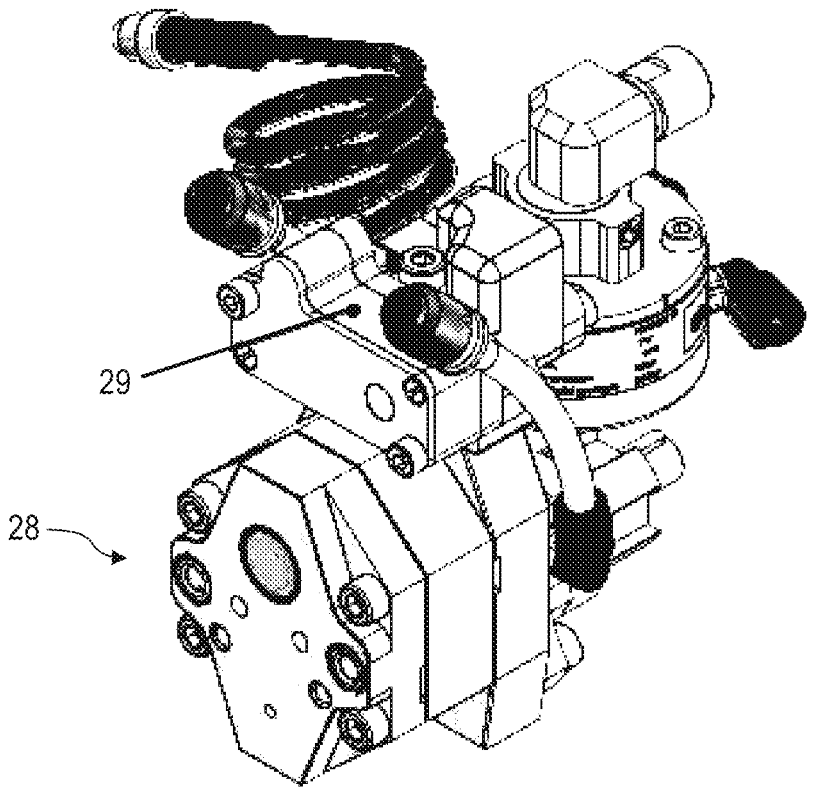
FIG. 6A shows a perspective view of a metering pump with a pressure measurement module.
Figure 6B:
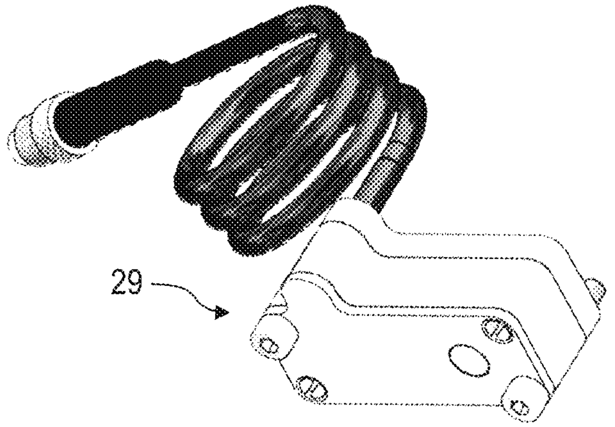
FIG. 6B shows a perspective view of the pressure measurement module of the metering pump from FIG. 6A.

FIGS. 6A and 6B show perspective views of a metering pump 28, which is arranged in the protected area 8 and meters the paint to be applied.

A pressure measuring module 29 is attached to the metering pump 28, which contains pressure sensors for measuring pressure at the inlet and outlet of the metering pump 28.

The disclosure is not limited to the preferred embodiments described above. Rather, a large number of variants and variations are possible which also make use of the idea of the disclosure and therefore fall within the scope of protection. In particular, the disclosure also claims protection for the subject matter and the features of the dependent claims independently of the claims referred to in each case and in particular also without the features of the main claim. The disclosure thus comprises different aspects of the disclosure which enjoy protection independently of each other.

The invention claimed is:

1. A coating device for coating components with a coating agent, having a protected area which is explosion-proof and/or is under high-voltage during operation, an unprotected area which is not explosion-protected and/or is at earth potential during operation, further comprising:

at least two sensors for measuring process variables of the coating device, wherein the sensors are arranged in the protected area, a data interface for external data communication, the data interface being arranged in the unprotected area, a transmission system for transmitting data between the sensors in the protected area and the data interface in the unprotected area, a collecting device, wherein the collecting device 1) is arranged in the protected area, 2) is connected to the sensors and receives measured values of the process variables from the sensors, and 3) is connected to the transmission system in order to transmit the measured values of the sensors to the data interface, a coating robot with a proximal robot arm and a distal robot arm, wherein the protected area is arranged at least partially in the distal robot arm and the unprotected area is arranged at least partially in the proximal robot arm, and a plastic insulating section in the distal robot arm between the protected area and the unprotected area.

2. The coating device according to claim 1, wherein a) the sensors are operated with electrical energy, b) the sensors are supplied with the electrical energy required for operation by the collecting device, and c) the transmission system, in addition to transmitting the data, also supplies the electrical energy for operating the sensors to the collecting device so that the collecting device can supply the sensors with the electrical energy required for operation.

3. The coating device according to claim 1, wherein a) the sensors are operated with electrical energy, b) the sensors are supplied with the electrical energy required for operation by a self-sufficient power supply with a battery, an accumulator, a mechanical compressed air generator, or an optical current generator arranged in the protected area.

4. The coating device according to claim 3, wherein the power supply is a battery.

5. The coating device according to claim 3, wherein a) the power supply in the protected area supplies the sensors with the electrical energy required for operation via the collecting device, and b) the power supply in the protected area is intrinsically safe to ensure explosion protection.

6. The coating device according to claim 1, wherein the transmission system comprises at least one optical waveguide for connecting the data interface in the unprotected area to the collecting device in the protected area and thereby effecting an electrical potential separation between the data interface and the collecting device.

7. The coating device according to claim 1, wherein the transmission system operates wirelessly in order to effect an electrical potential separation between the data interface and the collecting device.

8. The coating device according to claim 7, wherein the transmission system operates wirelessly by means of one of the following techniques:

a) an inductive coupling, b) a resonant-inductive coupling, c) a capacitive coupling.

9. The coating device according to claim 7, wherein the transmission system comprises the following components:

a) a transmitting coil for inductive coupling, b) an oscillator for driving the transmitting coil with an AC voltage signal, c) a transmitter-side resonant circuit coupled to the transmitting coil, d) a receiving coil for inductive coupling with the transmitting coil, e) a receiver-side resonant circuit coupled to the receiving coil, and f) a rectifier for rectifying the signal coupled into the receiving coil.

10. The coating device according to claim 1, wherein the transmission system is arranged at least partially in the distal robot arm.

11. The coating device according to claim 1, wherein a sensor is arranged in the unprotected area.

12. The coating device according to claim 1, wherein the sensors comprise at least one of the following sensors:

a) pressure sensor, b) flow sensor, c) speed sensor, d) force sensor, e) acceleration sensor, f) vibration sensor, g) temperature sensor.

13. The coating device according to claim 1, wherein the data interface provides at least one of the following interface types:

a) Ethernet interface, b) Bluetooth interface, c) USB interface, d) IO-Link, e) optical waveguide interface, f) an analog interface, g) a digital interface, h) Ethernet-based fieldbus systems, i) analog in/out interfaces, j) digital in/out interfaces.

14. The coating device according to claim 1, wherein the collecting device communicates digitally with individual sensors.

15. The coating device according to claim 1, wherein a power supply for the data interface is arranged in the unprotected area, the power supply in the unprotected area being intrinsically safe to ensure explosion protection.

16. The coating device according to claim 14, wherein the power supply is intrinsically safe according to at least one of the technical standards IEC/EN 60079-11—Part 11, IEC/EN 60079-25—Part 25 and IEC/EN 60079-14—Part 14.

17. The coating device according to claim 1, wherein a) the coating device comprises a metering pump which meters the coating agent and, in operation, comprises an inlet pressure and an outlet pressure, b) the metering pump is arranged in the protected area, c) one of the sensors is a pressure sensor which measures the output pressure of the metering pump, d) one of the sensors is a pressure sensor which measures the inlet pressure of the metering pump, e) one of the sensors is a temperature sensor measuring a coating agent temperature.

* * * * *